US012728055B2

(12) United States Patent
Custeau-Boisclair et al.

(10) Patent No.: US 12,728,055 B2
(45) Date of Patent: Sep. 8, 2026

(54) PATIENT HOIST

(71) Applicant: Arjo IP Holding Aktiebolag, Malmö (SE)

(72) Inventors: Olivier Custeau-Boisclair, Sherbrooke (CA); Denis-Alexandre Brulotte, Orford (CA); Jacob Bélanger-Brault, Sherbrooke (CA); Marie-Pier Gaudet, Sherbrooke (CA)

(73) Assignee: Arjo IP Holding Aktiebolag, Malmö (SE)

( * ) Notice: Subject to any disclaimer, the term of this patent is extended or adjusted under 35 U.S.C. 154(b) by 36 days.

(21) Appl. No.: 18/716,166

(22) PCT Filed: Nov. 25, 2022

(86) PCT No.: PCT/EP2022/083316

§ 371 (c)(1),
(2) Date: Jun. 4, 2024

(87) PCT Pub. No.: WO2023/104549

PCT Pub. Date: Jun. 15, 2023

(65) Prior Publication Data

US 2025/0041139 A1 Feb. 6, 2025

(30) Foreign Application Priority Data

Dec. 6, 2021 (SE) .................................... 2151485-6

(51) Int. Cl.
*A61G 7/10* (2006.01)

(52) U.S. Cl.
CPC .................................. *A61G 7/1042* (2013.01)

(58) Field of Classification Search
CPC ........... A61G 7/1042; B60L 5/40; B60M 1/34
USPC ............................ 5/83.1; 191/45 A; 212/337
See application file for complete search history.

(56) References Cited

U.S. PATENT DOCUMENTS

| | | | | |
|---|---|---|---|---|
| 2,537,866 A | | 1/1951 | Tanner | |
| 2,700,705 A | | 1/1955 | Anjeskey et al. | |
| 2,921,146 A | * | 1/1960 | Ericson | H01R 41/00 191/23 A |
| 2,958,743 A | | 11/1960 | Moore | |
| 3,337,697 A | * | 8/1967 | Martin | H02G 5/04 191/40 |
| 7,237,491 B2 | | 7/2007 | Faucher et al. | |

(Continued)

FOREIGN PATENT DOCUMENTS

WO 88/09159 A1 12/1988

OTHER PUBLICATIONS

International Search Report and Written Opinion issued in corresponding International Patent Application No. PCT/EP22/083316, dated Apr. 17, 2023.

*Primary Examiner* — J. T. Newton
(74) *Attorney, Agent, or Firm* — Morgan, Lewis & Bockius LLP

(57) ABSTRACT

A patient lift and a contacting apparatus for engaging a track conductor of a track in a track system of the patient lift are disclosed. The contacting apparatus is adapted to be mounted to a hoist trolley of the patient lift movably connected to the track system. The contacting apparatus has a biasing arrangement adapted to resiliently bias the contact carrier against the track conductor of the track.

13 Claims, 5 Drawing Sheets

(56) References Cited

U.S. PATENT DOCUMENTS

| | | | | |
|---|---|---|---|---|
| 8,701,226 | B2 * | 4/2014 | Faucher | A61G 7/1042 5/85.1 |
| 2012/0325586 | A1 * | 12/2012 | Meggs | B64D 11/0624 182/231 |
| 2019/0314235 | A1 * | 10/2019 | Karlsson | B62B 3/02 |
| 2020/0138657 | A1 | 5/2020 | Chandan et al. | |

* cited by examiner

PATIENT HOIST

TECHNICAL FIELD

Present invention relates to a contacting apparatus for a patient lift and a patient lift.

BACKGROUND

Hoists which ride on ceiling-mounted or other tracks are commonly used in hospitals and other care centers, as well as in the homes of those with mobility impairments, to convey people and/or equipment to different areas (e.g., from a bed to a bathroom). Examples of such hoists are provided, for example, in U.S. Pat. No. 7,237,491 and WO 88/09159.

Such hoists are usually electrically-powered, and they may ride on the tracks via manually-driven trolleys, or trolleys which are themselves electrically driven to assist in driving the hoists along their tracks. Power may be provided to the hoists via elongated flexible cables that follow the hoists along their tracks, but these can cause difficulties owing to the length of cable needed where the hoists are to travel long distances, and owing to the desire to avoid cable slack and dangling cable. Hoists have also been developed which are powered by rechargeable batteries, with the batteries being recharged when the hoist is placed at a docking position near the end of a track (or at any one of several docking positions along the track). These too pose difficulties in that users often forget to place the hoists back in their docking positions after use, leading to dead batteries and hoists which are inoperative until they are recharged (which can lead to hardships for their users). Some hoists have a feature wherein their trolleys automatically drive the hoists to a charging station when not in use, thereby better ensuring that their batteries remain charged.

However, such “return-to-charger” features are sometimes thwarted when objects (such as curtains, IV equipment, monitors, etc.) obstruct the return paths of the hoists. Additionally, return-to-charger features cannot easily be implemented in “moving-track” systems such as the ones shown in U.S. Pat. No. 7,237,491, wherein the track on which the hoist rides itself rides on another track (e.g. a first track aligned along one direction is relocatable on a second track oriented perpendicularly from the first track). In such systems, the hoist can move in a variety of directions (e.g., about a plane), but it is difficult to devise an inexpensive and reliable arrangement for having both the hoist and the track on which is rides reliably return to a charging station.

To address such issues, a conductive track may be implemented to continuously provide power. Such a solution is provided in U.S. Pat. No. 8,701,226 which described a patient hoist with a biased contact carrier following the contour of the track and biased against a conductor running along the track to thereby ensure conductive contact while the trolley of the hoist moves along the tracks. The inventors have however identified that there is still room for improvement in this field. For example, a track system may include multiple interconnected track sections, the track sections being stationary or movable. The contact brushes utilized for the conductive contact are often fragile and susceptible for wear and tear and are thus susceptible to impact damage due to the gaps and splices between the track sections. There is thus a need for providing a patient lift system that is more durable and suitable for continuous charging even in track systems comprising multiple interconnected sections.

SUMMARY

According to one aspect, a contacting apparatus for engaging a track conductor of a track in a track system of a patient lift is provided. The contacting apparatus is adapted to be mounted to a hoist trolley of the patient lift movably connected to the track.

The contacting apparatus comprises a mounting console adapted to be mounted to the hoist trolley and a contact carrier arranged to be in conductive contact with the track conductor. The contacting apparatus further comprises a lever arm pivotally connected to the mounting console and a biasing arrangement. The biasing arrangement is adapted to resiliently bias the contact carrier against the track conductor to accommodate conductive contact between the track conductor and the contact carrier.

According to one aspect a patient lift is provided. The patient lift comprises a hoist comprising an electrically-actuated lifting member actuatable between a raised and lowered position. The patient lift comprises a track system comprising a first track portion and a second track portion. The first track portion comprises a track conductor. The track conductor extends along the first track portion.

The patient lift further comprises a hoist trolley mounted to the hoist and movably connected to the track system. The first track portion and the second track portion are aligned or alignable to accommodate passage of the hoist trolley between said first and second track portion.

The patient lift further comprises a contacting apparatus mounted to the hoist trolley. The contacting apparatus comprises a contact carrier arranged to be in conductive contact with the track conductor of the first track portion and a biasing arrangement. The biasing arrangement is adapted to resiliently bias the contact carrier against the track conductor to accommodate conductive contact between said track conductor and contact carrier.

The patient lift further comprises a guiding arrangement. The guiding arrangement is arranged to engage the contact carrier to move said contact carrier out of contact with the track conductor of the first track portion as the contact carrier engages the guiding arrangement upon movement of said hoist trolley in a direction extending from the first track portion to the second track portion.

According to one aspect a patient lift is provided. The patient lift comprises a hoist. The hoist comprises an electrically-actuated lifting member actuatable between a raised and lowered position. Further, the patient lift comprises a track system and a hoist trolley.

The track system comprises a first track and a second track, each comprising a track conductor extending along the first and second track, respectively. The hoist trolley is mounted to the hoist and is movably connected to the track system. The first track and the second track are alignable or aligned to form a junction accommodating passage of the hoist trolley between said first and second track.

The patient lift further comprises a contacting apparatus mounted to the hoist trolley. The contacting apparatus comprises a contact carrier arranged to be in conductive contact with the track conductor of the first track and second track and a biasing arrangement. The biasing arrangement is adapted to resiliently bias the contact carrier against the track conductor to accommodate conductive contact between the track conductor and the contact carrier.

In addition, the patient lift comprises a guiding arrangement. The guiding arrangement is arranged at the junction. The guiding arrangement is arranged to engage the contact carrier to move said contact carrier out of contact with the track conductor of the first track as the contact carrier approaches the junction upon movement of the hoist trolley in a direction extending from the first track to the second track.

Further objects and features of the present invention will appear from the following detailed description of embodiments of the invention.

BRIEF DESCRIPTION OF DRAWINGS

The invention will be described with reference to the accompanying drawings, in which.

DETAILED DESCRIPTION

Figure 1:
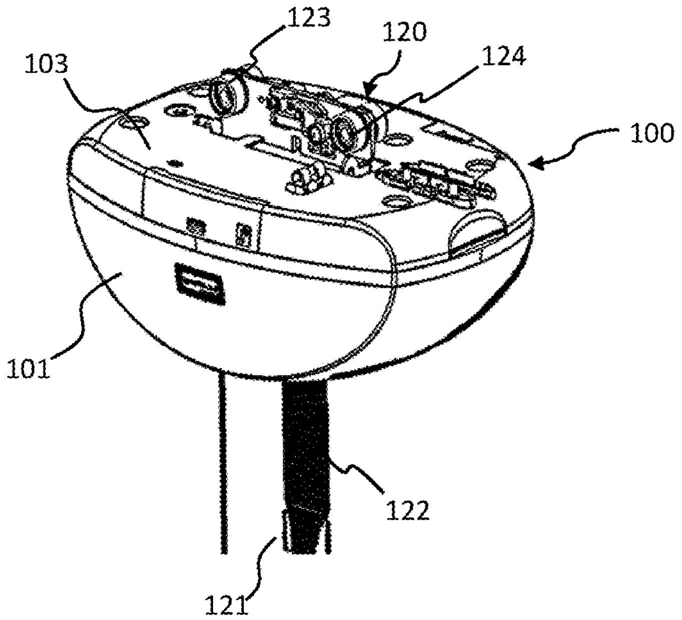
FIG. 1 is a perspective view of a hoist trolley for a patient lift according to an embodiment.

With reference to FIG. 1 aspects of a patient lift 100 according to the invention is depicted. The patient lift 100 comprises a hoist 101 with an electrically-actuated lifting member 121 which is movable (actuatable) between a raised and lowered position, i.e. at least one raised and lowered position. In FIG. 1, the lifting member 121 is depicted as connector for connecting to a harness bar, in other embodiments the lifting member may be in the form of a sling, basket etc.

The patient lift 100 further comprises a hoist trolley 103. The hoist trolley 103 is mounted to the hoist 101 to transport the hoist to different locations. The hoist trolley 103 is adapted to ride along a track system. The hoist trolley may be provided with wheels or sliding members such as magnetic levitation sliding members, for running along the track system.

The hoist trolley 103 illustrated in FIG. 1 is shown as being of a type wherein four wheels 123, 124 drive the hoist trolley 103 along the track system, with the wheels 123, 124 being driven by an appropriate drive system situated on or within the hoist 101. However, it should be understood that any number of drive wheels (or pinions or other drive mechanisms) could be used instead. It is also possible that the hoist trolley might be driven along the track by a belt, cable, or other drives rather than being driven by the wheels 123, 124.

Figure 2:
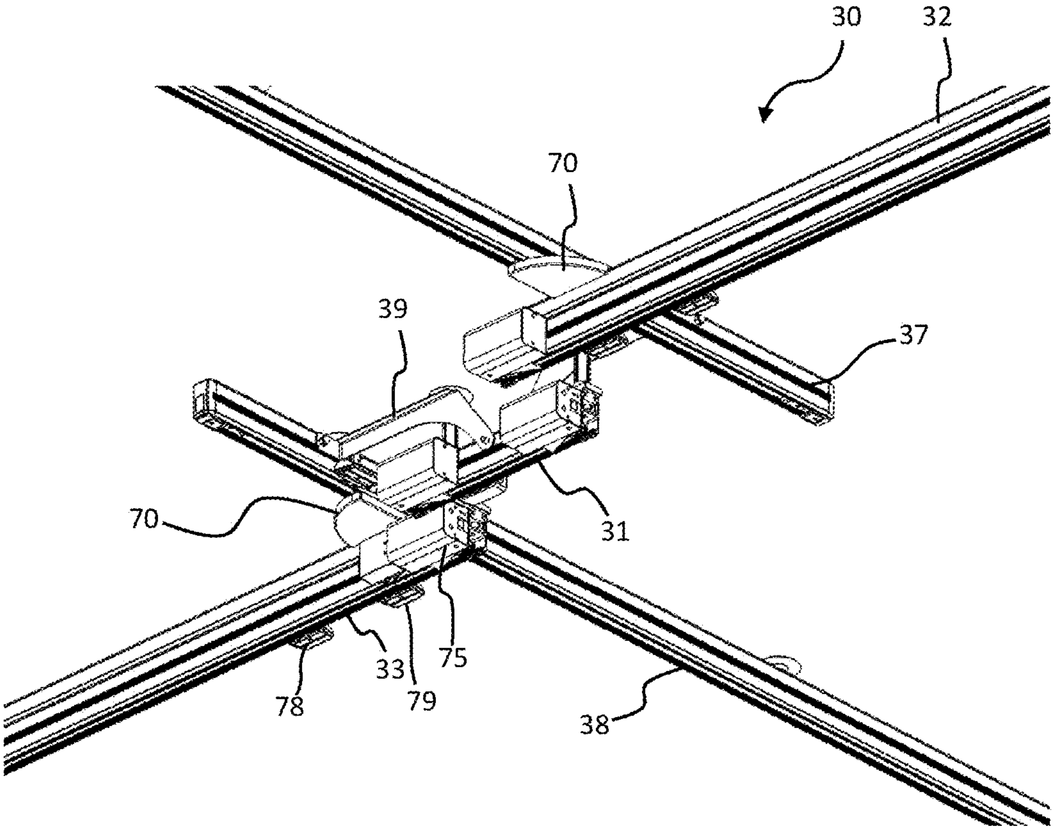
FIG. 2 is a perspective view of a track system for a patient lift system according to an embodiment.

FIG. 2 depicts an exemplary track system 30. The track system 30 comprises a plurality of tracks 31, 32, 33, 37, 38. For example, the track system 30 may comprise a first track 31 and a second track 32. The first track 31 and a second track 32 may be alignable or aligned to form a junction. The junction accommodates passage of the hoist trolley between the first and second track. Alignable or aligned herein refers to at least one of the first and second track being moved into alignment or being fixedly arranged in alignment to form the junction allowing for the hoist trolley to move between the first and second track. Accordingly, the first and second track are arranged to in at least in an aligned state form a continuous track with a first and second portion formed by the first and second track, respectively, said first and second portion being separated by the junction. The junction thus constitutes an interface between the first and second track when said first and second track is in the aligned state.

In other words, the extension of first track 31 and second track 32, along which the hoist trolley is movable, are aligned or alignable to extend along a common direction, such that the hoist trolley may pass between said first and second track and the ends of said tracks are facing each other and are arranged in planes orthogonal to the extension of the first track 31 and second track 32, respectively.

A junction as such may be considered a gate. As will be further described in FIG. 9, the tracks may include functionality for continuous charging and powering of the host. Accordingly, the tracks of the track system 30 or at least the first and second track 31, 32 may each comprise a track conductor extending along said first and second track 31, 32, respectively.

The hoist trolley may be implemented in both fixed-track systems in moving-track systems. For example, the first and second track may be movable relative each other, whereby the first and second track are alignable to form the junction. Alternatively, the first and second track may be fix relative each other and fixedly arranged in alignment. Thus, the first and second track may be aligned to form the junction.

In one embodiment, one of the first track 31 and the second track 32 is a stationary track and the other is a movable track. In one embodiment, the movable track may be translationally and/or rotationally movable relative the stationary track.

The track system 30 depicted in FIG. 2 is a moving-track-system. The track system 30 may comprise a first set of tracks for receiving the hoist trolley and a second set of tracks for suspending, preferably movably suspending, the first set of tracks. The first set of tracks may be hoist tracks and the second set of tracks may be suspension tracks. The first set of tracks may be a lower set of tracks and the second set of tracks may be an upper set of tracks.

The track system comprises the first track 31. The first track 31 may a fixed track and may be considered a gate track. The first track may form a part of the set of hoist tracks. The first track 31 may together with the second track 32 form a junction. The second track 32 may form a part of the set of hoist tracks. The third track 33 may form a part of the set of hoist tracks. The second and/or third track may be movable to align with the first track to form said junction. Accordingly, the first, second and third track may be comprised in the set of hoist tracks of the track system.

The first track 31 may together with the third track 33 form a junction in a corresponding manner to the second track 32. The second track 32 and/or third track 33 may be movable relative the first track 31.

The first track 31 may be fixedly mounted by means of a fixing structure 39. The fixing structure may for example be fixedly mounted to a ceiling or one of the tracks of the set of suspension tracks.

Further referencing FIG. 2, the hoist trolley may electrically communicate with the set of hoist tracks, thus being electrically connected to said set of hoist tracks. The set of hoist tracks may bear the hoist trolley. Said set of hoist tracks may ride on the set of suspension tracks.

As depicted in said FIG. 2, at least one of the tracks of the set of hoist tracks may be movably connected to the set of suspension tracks for allowing movement of said at least one of the tracks of the set of hoist tracks.

The set of suspension tracks may comprise a first suspension track 37 and a second suspension track 38. As depicted the second track 32 is movably connected to the first suspension track 37. The third track 33 is movably connected to the second suspension track 38. The second and/or third track may be movably connected so as to allow for translational movement of said second and third track along the first suspension track 37 and the second suspension track, respectively.

In the depicted track system, the first track 31 is a stationary track and the second track 32 and the third track 33 are translationally movable relative said first track 31. The second track 32 and the third track 33 are thus translationally movable along the first suspension track 37 and the second suspension track 38, respectively.

The second and third tracks has a guiding portion arranged in the suspension track that suspends said second or third track in said suspension track. The guiding portion is further movable along said suspension track to enable translational movement of the second track 32 and the third track 33, respectively.

The tracks of the set of suspension tracks may include suspension track conductors (e.g., track conductors such as those which will be further described with reference to FIG. 4) in electrical communication with track conductors of the tracks of the set of hoist tracks. For example, the second and third tracks of the set of hoist tracks may be provided with a stationary contact carrier in conductive communication with the track conductors of the corresponding tracks of the set of suspension tracks. The suspension track conductors may be connected to a power supply (not shown). Thus, the power supply supplies power in turn to the suspension track conductors of the set of suspension tracks, the contact carriers of the hoist tracks, the track conductors of the hoist tracks, and finally a contact carrier of a contacting apparatus mounted to the hoist trolley, and thus to the hoist.

In an alternative embodiment, the tracks of the set of suspension tracks may be provided with electrical wiring connected to a power source. Said electrical wiring may be connected to a power terminal of the track of the set of hoist tracks movably connected to said track of the set of suspension tracks. The power terminal may in turn be connected to the track conductor(s) of the track of the set of hoist track to transfer power thereto. Accordingly, power may be transferred from the set of suspension tracks to the set of hoist tracks, i.e. the track conductors of the tracks of the set of hoist tracks, by means of a wired connection. Power may also be transferred to the set of suspension tracks from the set of hoist tracks, i.e. from the track conductors of the tracks of the set of hoist tracks, by means of the wired connection. The wired connection may thus be further connected to accessories and/or electrical components connected the set of suspension tracks.

The tracks of the track system may be provided with track operation units 75. The track operation units may comprise electronic and mechanical means for operating the functions of the track. For example, the track operation unit 75 may comprise a track drive configured to drive movement of the track, i.e. the movable track, and a track operation control unit configured to control the functions of the track. The track operation control unit may be configured to control said track drive. The track drive may be mechanically connected a driven member such as a wheel or cog in engagement with the suspension track for driving the movable track of the set of hoist tracks along the suspension track of the set of suspension tracks.

The tracks of the track system may also be provided with one or more activation switches 78, 79. The activation switches are configured to detect the position and/or passage of the contacting apparatus in engagement with the hoist track. Alternatively or additionally, the activation switch may be configured to detect the passing of the hoist trolley. The one or more activation switches may operatively be connected to the track operation unit 75.

For example, the hoist tracks may comprise a first activation switch 78 and a second activation switch 79 for detecting passage of the hoist trolley onto the track from both directions. Upon detection of the hoist trolley engaging the track, the track operation control unit may in response activate the drive to enable movement of the track. In response to the hoist trolley being close to leaving the track, the track operation control unit may cause the track drive to move and lock the track into alignment with an adjacent track to enable passage to said adjacent track.

Figure 3:
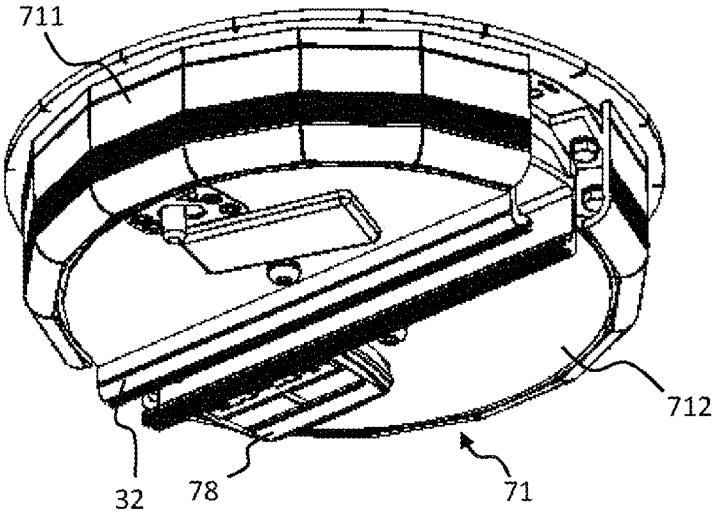
FIG. 3 is a perspective view of a track and a rotation arrangement of a track system for a patient lift system.

FIG. 3 depicts a second track 32 which is rotationally movable relative to a first track. To enable rotational movement of the second and/or third track relative the first track 31, the second track 32 and/or the third track 33 may be mounted to a rotation arrangement 71. In one embodiment allowing for additional relative movement between the tracks, the second track 32 and/or the second track 33 may be mounted to the first suspension track 37 and the second suspension track 38 via said rotation arrangement 71. In such an embodiment, the movable track is translationally movable and rotationally movable relative the stationary track.

The rotation arrangement 71 may be in the form of a turntable. The rotation arrangement comprises a first part 711 and a second part 712 rotatably mounted to said first part 711. The track 32 is mounted to the second part 712. The rotation arrangement 71 may further comprise a rotation drive unit for driving the rotational movement of the second part 712. In operation, the hoist trolley is driven to a position along the track mounted to the rotation arrangement, whereby the rotation arrangement upon activation rotates the second part thereby rotating the track to a new position aligned with an adjacent track to accommodate passage to said adjacent track.

As described with reference to FIG. 2, the second track 32 depicted in FIG. 3 may be provided with a track operation unit, whereby the rotation unit described above may be considered a track drive as described with reference to FIG. 2. As depicted in FIG. 3, the rotation arrangement may be provided with an activation switch 78 in accordance with the track in FIG. 2.

Figure 4:
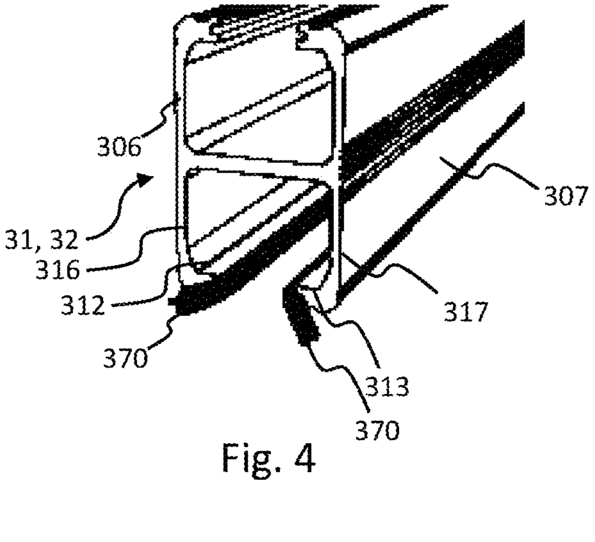
FIG. 4 depicts a portion of a track of a track system of the patient lift.

FIG. 4 depicts a portion of a track of the track system 30. The track comprises the track conductor 370 extending along the track. Preferably, the track comprises a first and second track conductor 370 each extending along said track. As depicted, the first and/or second track conductor 370 may be inwardly facing, thus facing a center of the track 31, 32. Thereby, the functional components may be arranged within the track, allowing for a more space-efficient patient lift.

The track 31, 32 may have opposing spaced track sides 306, 307 each of which has an elongated track floor 312, 313 which is oriented at least substantially horizontally, and an elongated track wall 316, 317 extending upwardly from the track floor 312, 313.

Preferably, the track 31, 32 is provided with the first track conductor and a second track conductor 370. As depicted in FIG. 4, each of the track sides 306, 307 may be provided with a track conductor 370. The track conductor 370 is intended to transfer power to the hoist 101 to enable actuation of its lifting member.

To assist in easy maintenance of the track conductors 370, they are preferably provided as strips which are readily installable and removable within the track sides 306. 307.

In the exemplary patient lift 100 shown in the drawings, the track conductors 370 are provided on the opposing edges of the track floors 312, 313 of the track sides 306, 307. At least a portion of the hoist trolley 103 rides between the track sides 306, 307, with wheels, pinions, or other drive members allowing the hoist trolley 103 to roll or be driven along the track 31, 32. Preferably, a suspension structure of the hoist trolley is arranged to be movable along the track between the track sides. The suspension structure will be further described with reference to FIG. 5.

The exemplary track 31, 32 illustrated throughout the drawings is configured similarly to a pair of C-channels, which are joined with their mouths facing in opposing directions.

In one embodiment, the track 31, 32 may comprise at least one connection groove each being adapted to receive a track conductor 370. The track conductor may comprise a corresponding connection tongue adapted to be inserted into said connection groove. Thus, the track 31, 32 is readily constructed by simply installing the track conductors 370 therein.

Once the track conductors 370 are installed within the track 31, 32, the hoist trolley may be installed on the track 31, 32 by slipping the hoist trolley between the track sides 306, 307. In one embodiment, an end cap may be fitted to the end of the track 31, 32 to close it.

The track conductors 370 are preferably in the form of conductive strips. The conductive strips may be coextruded within plastic sheaths. Said sheaths may comprise the connection tongues for attachment within the connection grooves in the track sides 306, 307 so that the track conductors 370 are insulated from the (metal) track 108 and its track sides 306, 307. While not preferred, it is possible for a metal track 31, 32 to serve as one of the track conductors 370.

Thus, in one embodiment, the hoist trolley 106 and track 31, 32 may be made of metal for strength and durability.

As will be described with reference to FIGS. 7 and 8, the patient lift may comprise a contacting apparatus with a contact carrier mounted to the hoist trolley. The contact carrier of said contacting apparatus is arranged to be in conductive contact with the track conductor for powering aspects of the hoist and/or hoist trolley.

Figure 5:
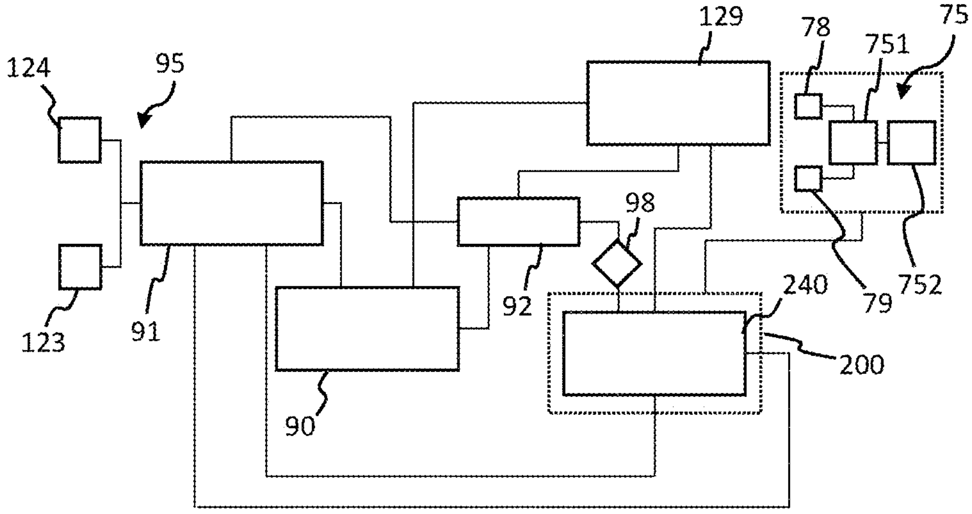
FIG. 5 is a schematic block diagram of components of the patient lift.

With reference to FIG. 5, a schematic block diagram depicting components of the patient lift. The patient lift may comprise a contacting apparatus 200 mounted to the hoist trolley. The contacting apparatus 200 comprises a contact carrier 240 arranged to be in conductive contact with the track conductors of the track system.

The patient lift may comprise a drive system 95. The drive system may be adapted to drive the hoist trolley along the track system, i.e. tracks of the track system. The drive system 95 may be electrically connected to the contact carrier 240, whereby the drive system 95 may be driven by means of power provided by the contact carrier 240.

The drive system 95 may comprise a drive unit 91 connected to the wheels 123, 124 of the hoist trolley for driving said wheels to move the hoist trolley. It should however be recognized that the hoist trolley may be driven in any conventional readily available manner. For example, the drive system may comprise a plurality of drive units, each driving a separate wheel, or a drive unit in the form of a belt drive for driving the hoist trolley.

The patient lift may further comprise a control unit 90. The control unit 90 may be operatively connected to the drive system 95. The control unit 90 may be configured to control said drive system 95.

Further referencing FIG. 5, the patient lift may further comprise a battery unit 92. The battery unit 92 may be electrically connected to the contacting apparatus 200 for power transfer between the battery unit 92 and the contacting apparatus 200.

The battery unit 92 may be electrically connected to the drive system 95. The battery unit 92 may be electrically connected to the contact carrier 240. To allow for movement between tracks even when the contact carrier is not in conductive contact with a track conductor, the control unit 90 may be configured to switch to a battery powering mode in which the drive system 95 is solely powered by the battery unit 92 in response to the contact carrier 240 not being in conductive contact with a track conductor.

The patient lift may further comprise a charging unit 98 electrically connected to the battery unit 92. The charging unit 98 may be configured to charge said battery unit 92 by means of power provided by the contact carrier 240. Thus, the charging unit 98 may be electrically connected to the contact carrier 240. Thus, the battery unit 92 may be connected to the contacting apparatus 200 via the charging unit 98.

The patient lift, i.e. the hoist of the patient lift, may comprise a hoist actuator 129 configured to actuate the electrically-actuated lifting member between a raised and lowered position. The hoist actuator 129 is electrically connected to the contact carrier 240 for powering of said hoist actuator. Advantageously, the hoist actuator 129 may be operatively connected to the control unit 90. The control unit 90 may be configured to control said hoist actuator 129.

The battery unit 92 may be electrically connected to hoist actuator 129 and configured power said hoist actuator 129. In one embodiment, the battery powering mode may alternatively or additionally include powering the hoist actuator 129 solely by means of the battery unit 92.

In one embodiment, any one or each of the drive system, control unit and battery unit may be provided on the hoist or hoist trolley.

As further depicted in FIG. 5, the battery unit 92 may for example be configured to power accessories provided on the tracks by means of the contacting apparatus 200. The battery unit 92 may thus be configured to transfer power to at least one electric component. The electric component is electrically connected to one of the track conductors via the contacting apparatus. The battery unit 92 is configured such that it may power said at least one electric component. Accordingly, the battery unit 92 is configured to transfer power to at least one electric component electrically connected to the track conductor 370 of the first and/or second track and/or track portion (as will be described with reference to FIG. 9) via the contacting apparatus to thereby power said at least one electric component.

This is particularly advantageous since the lift in itself is not required to have a large contact blade for providing the same functionality. Instead, this may be performed by means of the contacting apparatus according to the invention (which will be further described with reference to FIGS. 7 and 8).

Preferably, the battery unit 92 is configured to power the electric and mechanical means to operate the track (as described with reference to FIGS. 2 and 3). The battery unit 92 may be configured to power the track operation unit 75.

Accordingly, the at least one electric component may be any one of an activation switch 78, 79 configured to detect the position and/or passage of the contacting apparatus 200 relative the track and/or track portion, a track drive 752 configured to drive the movement of the track and/or track portion, i.e. the hoist track, a track operation control unit 751 configured to control the operation of the track drive 75. Preferably the battery unit 92 is configured to power each of said components provided on the track while the hoist trolley is suspended from said track.

Figure 6:
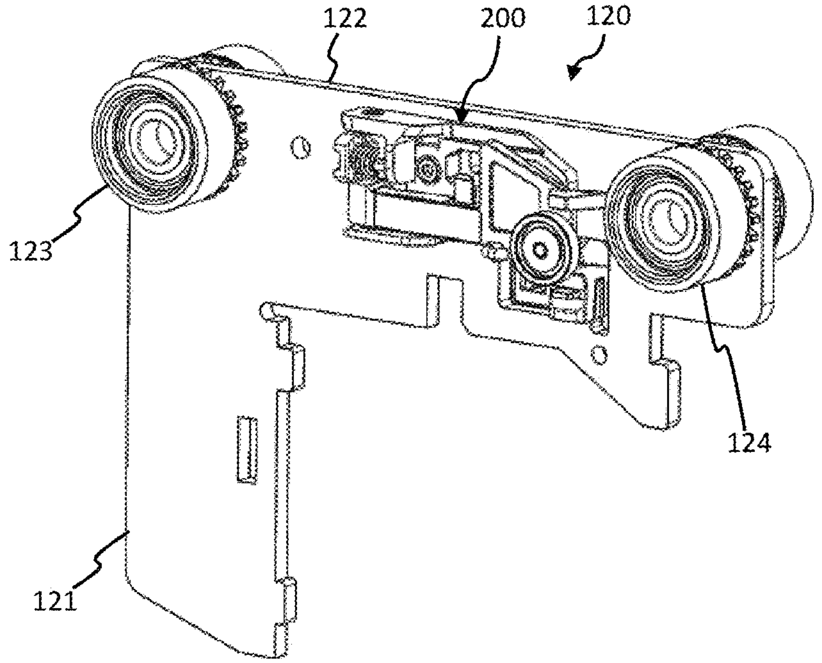
FIG. 6 is a front view of a suspension structure of a patient lift according to an embodiment.

FIG. 6 depicts a suspension structure 120 which may be comprised in the hoist trolley. The suspension structure 120 comprises a main body portion 121. The main body portion 121 is arranged to protrude from the chassis of the hoist trolley. The main body portion 121 is arranged to at least partially extend into the tracks of the track system, i.e. the first, second and/or third track. The main body portion 121 may be provided with the wheels 123, 124 and/or sliding members for interacting with the tracks.

As aforementioned, to ensure power transfer from the track conductors to the hoist trolley and subsequently the hoist, the patient lift comprises a contacting apparatus. Said contacting apparatus 200 may be mounted to the suspension structure 120.

Figure 7:
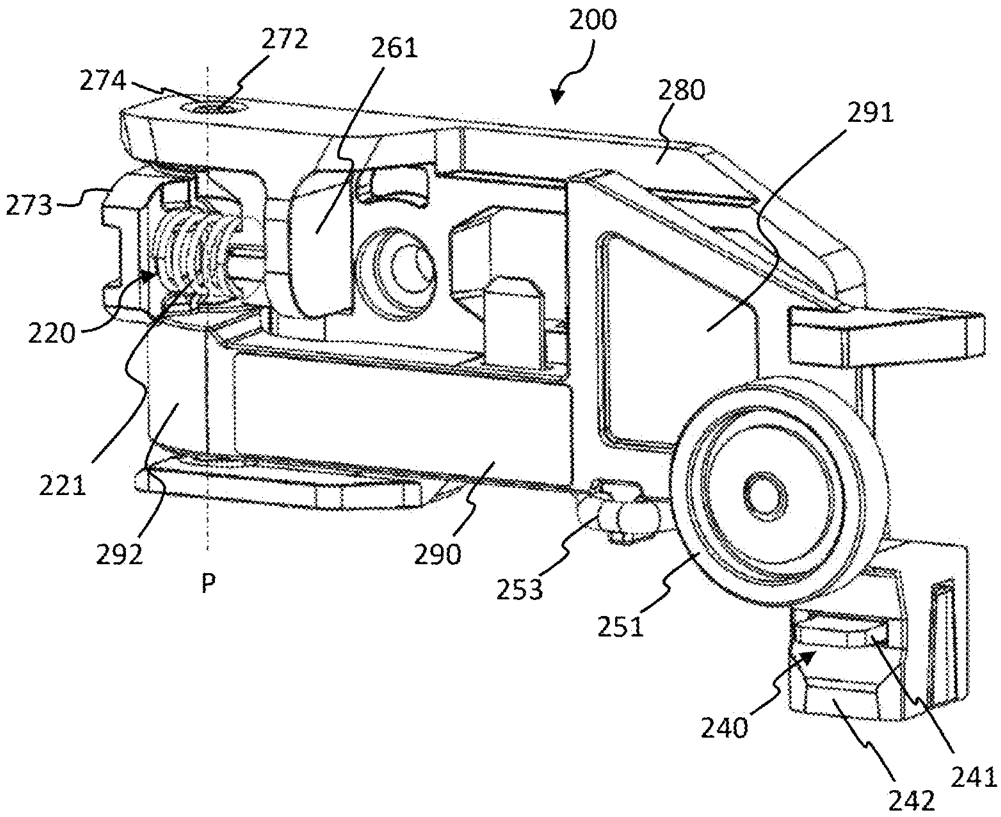
FIG. 7 is a front view of a contacting apparatus of a patient lift according to an embodiment.
Figure 8:
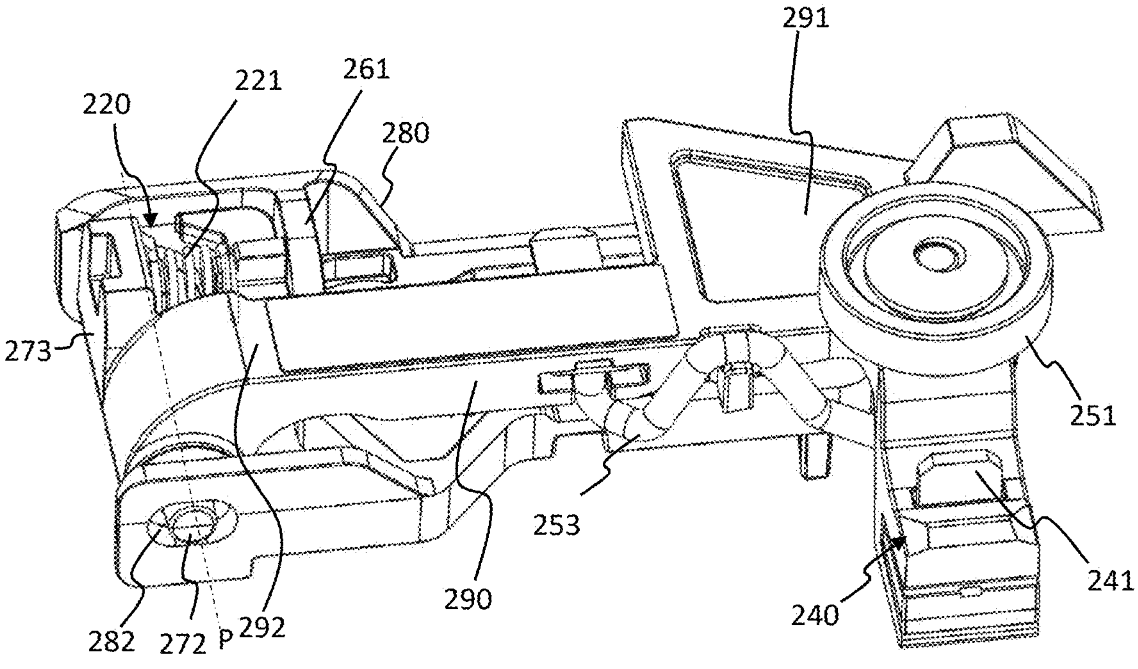
FIG. 8 is a side view of a contacting apparatus of a patient lift according to an embodiment.

The contacting apparatus 200 is depicted in further detail in FIGS. 7 and 8 in further detail.

The contacting apparatus 200 is intended for engaging the track conductor of a track in the track system of the patient lift. Thus, the contacting apparatus 200 is intended for engaging the track conductor of the first, second track and/or third track.

The contacting apparatus 200 is adapted to be mounted to the hoist trolley of the patient lift. The hoist trolley is movably connected to the track, for example the first and second track. Preferably, the contacting apparatus 200 is adapted to be mounted to the suspension structure described with reference to FIG. 6.

The contacting apparatus 200 comprises a mounting console 280. The mounting console 280 is adapted to be mounted to the hoist trolley 103, preferably to the suspension structure.

Accordingly, the contacting apparatus 200 may be mounted to the hoist trolley. The contacting apparatus 200 comprises a contact carrier 240. The contact carrier 240 is arranged to be in conductive contact with the track conductor of the track. The contacting apparatus 200 further comprises a biasing arrangement 220. The biasing arrangement 220 is adapted to resiliently bias the contact carrier 240 against the track conductor to accommodate conductive contact between the track conductor and the contact carrier 240.

The contacting apparatus 200 further comprises a lever arm 290. The lever arm is pivotally connected to the mounting console 280. The biasing arrangement 220 may be adapted to resiliently bias the contact carrier 240 against the track conductor to accommodate conductive contact between the track conductor and the contact carrier 240. The biased lever arm of the contacting apparatus allows for sufficient contact between the contact carrier and the track conductor even when there is a turn or change in elevation in the extension of the track. Further, the lever arm is more durable compared to a directly biased contact carrier as known in the prior art. Thus, the contacting apparatus allows for reliable and durable continuous power transfer between the track and the hoist and hoist trolley.

Furthermore, the biased lever arm allows for robust control of the engagement between the contact carrier and the track conductor even in cases where the trolley passes through a gap between two adjacent tracks.

Preferably, the biasing arrangement 220 resiliently connects the lever arm 290 and the mounting console 280. As depicted, a spring 221 of the biasing arrangement may resiliently connect the lever arm 290 and the mounting console 280. Accordingly, a first end of the spring 221 may be connected to the lever arm 290 and a second opposite end of the spring 221 may be connected to the mounting console 280.

The contacting apparatus 200 may further comprise wiring 253 adapted to be in electrical communication with the hoist and the contact carrier 240, whereby electrical power may be transferred from the contact carrier to the hoist. Preferably, the wiring 253 is connected to contacts of the hoist trolley in turn connected to the hoist.

The contact carrier 240 may be mounted to a first portion 291 of the lever arm 290. A second opposite portion 292 of the lever arm 290 may be pivotally connected to the mounting console 280. Said second portion of the lever arm 290 may be further connected to the biasing arrangement 220 for urging the contact carrier 240 to come into contact with the track conductor 370. The first portion 291 may thus form a pivot point for pivoting of the lever arm 290.

The first portion of the lever arm may be a first end of the lever arm 290 and the second portion of the lever arm may be a second end of the lever arm 290 opposite to said first end.

As illustrated in FIGS. 7 and 8, the contact carrier 240 may be formed by several components which are readily fit together to form the contact carrier 240.

The contact carrier 240 may thus comprise a contact part 241. The contact part 241 may be in the form of a brush which may be formed similarly to brushes found in DC motors and similar devices. Preferably, the contact part 241 may be in a copper-graphite. The contact part 241 may be electrically connected to the hoist trolley and/or hoist by means of the wiring 253.

The contact carrier 240 further comprises an engaging part 242, arranged to engage a guiding arrangement which is described in further detail in FIG. 8. The engaging part 242 may be made of plastic. In addition or alternatively, the contact carrier 240 apart from the contact part 241 may be made of plastic for insulating purposes.

A contact carrier formed with a separate part for engaging a guiding arrangement for selectively allowing contact between the contact part and the track conductor allows for a more durable contacting apparatus since the material of the engaging part may be chosen to optimize durability. Although not preferable, the entire contact carrier 240 may alternatively be in a conductive material and may form a single integrated contact part.

The lever arm 290 may be arranged to extend in a direction parallel to the track conductor of the track system, i.e. the first and second track. The lever arm 290 may be pivotable about a pivot axis P. The pivot axis P extends orthogonally to the track conductor. Preferably, the lever arm 290 is pivotally mounted to the mounting console 280 by means of a pivot pin 272. The pivot pin 272 may extend along the pivot axis P. The pivot pin 272 may form said pivot axis P.

Preferably, the lever arm 290 extends orthogonally to said pivot axis P. Depending on the positioning of the track conductor in the track, the pivot axis P may extend orthogonally to the track conductor and in a vertical direction or extend orthogonally to the track conductor and in a horizontal direction.

To avoid components outside of the track, the biasing arrangement 220 may be adapted to resiliently bias the lever arm outwardly from a center axis extending along the track towards the track conductor, the track conductor being arranged at an inner wall of the track.

To allow for further compensation for the track being uneven or including curves etc., a first end of the pivot pin 272 may be rotatably arranged in a bearing 274 of the mounting console 280. A second end, e.g. a second opposite end, is arranged in a guiding slot 282 of the mounting console 280. The guiding slot 282 is arranged to allow tilting movement of the lever arm 290 relative the pivot axis P. Preferably, the pivot pin 272 may extend through a hole in the lever arm 290, said hole extending through the second portion 292 of the lever arm 290. The biasing arrangement 220 may be arranged to bias the lever arm 290 against said tilting movement. Thus, the biasing arrangement 220 may be arranged to provide a counteracting spring force acting against said tilting movement. The tilting movement is thus provided about a tilting axis orthogonal to the pivot axis P and intersecting said pivot axis P.

The guiding slot 282 is an elongated slot provided in the mounting console. The guiding slot 282 extends in a direction extending parallel to the lever arm 290 to enable movement of the pivot pin 272 along said slot. The guiding slot 282 may be provided in a flange of the mounting console 280 protruding in a direction orthogonal to the lever arm.

The biasing arrangement may be a spring arrangement. As depicted in FIGS. 7 and 8, a spring 221 of the biasing arrangement 220 may be arranged to at least partially extending in a direction parallel to the lever arm 290. The spring 221 of the biasing arrangement 220 may be further arranged to extend along the track conductor. The spring 221 connects a mounting shoulder 273 of the lever arm arranged at the first portion of the lever arm 290 and a lip 261 of the mounting console 280. The spring 221 may be arranged to bias the lever arm 290. The spring 221 is thus arranged to provide a counteracting spring force acting against the tilting movement. Preferably, the spring 221 is arranged proximally to the first portion of the pivot pin 272 further allowing the spring to provide sufficient biasing torque against the tilting movement to allow for stable movement of the hoist trolley along the track.

As depicted in FIGS. 7 and 8, the biasing arrangement may comprise only the spring 221. Said spring 221 is thus arranged to both bias the lever arm against the tilting movement and the pivoting relative the pivot axis P. Thereby, a less complex contacting apparatus is provided. As depicted, the spring biases the pivoting movement of the lever arm due to the pivoting in a first rotation direction causing compression of said spring and in a second opposite rotation direction causing extension of said spring.

Advantageously, the contacting apparatus further comprises a guiding wheel 251 for engaging with the track system, e.g. the first and second track. As depicted, the guiding wheel 251 is provided on the lever arm 290. The guiding arrangement may be implemented in combination with the above described contacting apparatus.

According to an aspect of the present invention, the contacting apparatus is combined with a guiding arrangement arranged in conjunction with the track system. The guiding arrangement is schematically depicted in FIG. 9.

Figure 9:
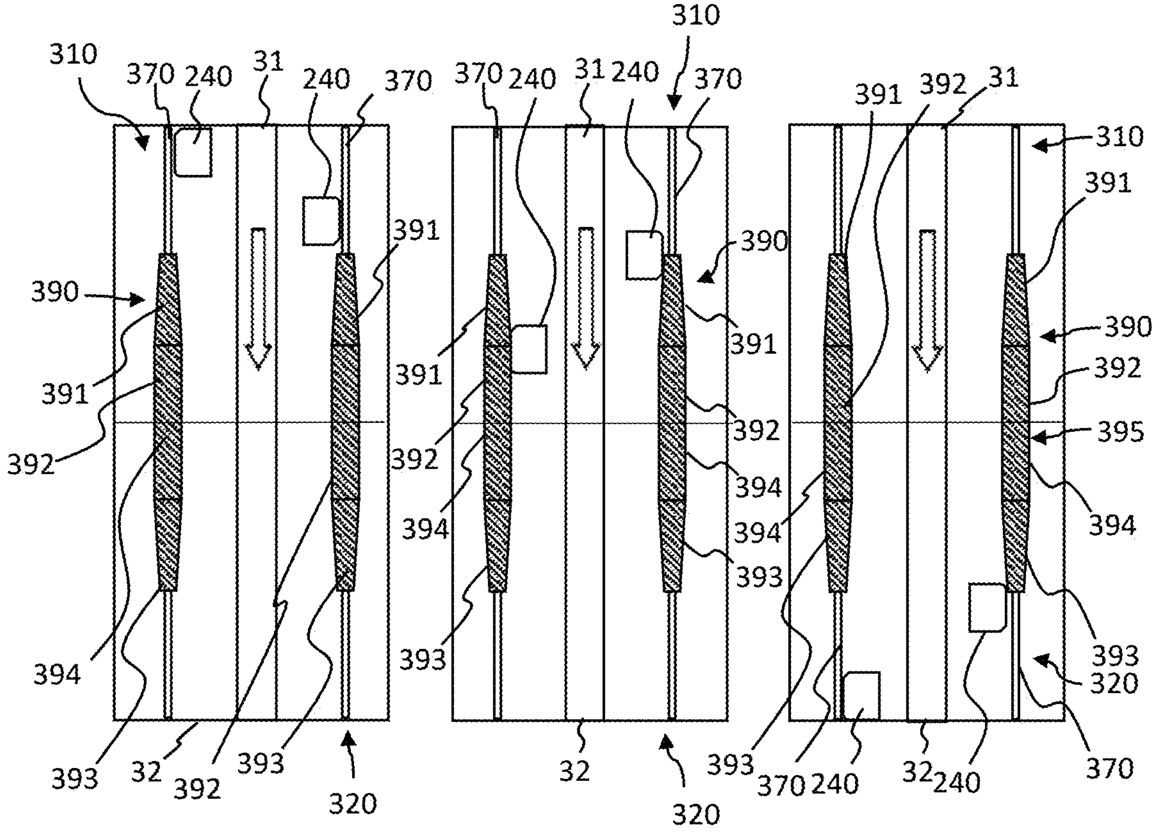
FIG. 9 depicts a guiding arrangement and track system of a patient lift according to an embodiment.

Referencing FIG. 9, the track system comprises a first track portion 310 and a second track portion 320. The hoist 101 may thus be movable along said first track portion 310 and second track portion 320. The first and second track portion may be formed as tracks or parts thereof as described with reference to FIGS. 2 to 4.

The first track portion 310 may comprise the track conductor 370. The track conductor 370 extends along the first track portion 310. The hoist trolley is movably connected to the track system 30. The first track portion 310 and the second track portion 320 are alignable or aligned to accommodate passage of the hoist trolley between said first track portion 310 and second track portion 320.

The patient lift further comprises a contacting apparatus mounted to the hoist trolley. The contacting apparatus comprises a contact carrier 240 arranged to be in conductive contact with the track conductor 370 of the first track portion 310 and a biasing arrangement. The biasing arrangement is adapted to resiliently bias the contact carrier 240 against the track conductor 370 to accommodate conductive contact between said track conductor 370 contact carrier 240.

The guiding arrangement 390 is arranged to engage the contact carrier 240 to move said contact carrier 240 out of contact with the track conductor 370 of the first track portion 310 as the contact carrier 240 engages the guiding arrangement 390 upon movement of the hoist trolley 103 in a direction extending from the first track portion 310 to the second track portion 320.

This allows for control of the engagement between the contact carrier 240 and track conductor 370 in a simple manner. The guiding arrangement provides a transition for said engagement, which reduces the wear on the often fragile contact carrier. Furthermore, it allows for setting up accessories provided with power via the contact between the contact carrier and the track conductor at set positions along a track, separate charging zones along a track and guiding of the contact carrier across junctions etc., without the contact carrier bumping into for example gaps or protruding ends of the track conductor.

The second track portion 320 may also comprise a track conductor 370. The track conductor 370 may extend along said second track portion 320. The contact carrier 240 is arranged to be in conductive contact with the track conductor 370 and the biasing arrangement is adapted to resiliently bias the contact carrier 240 against the track conductor 370 to accommodate conductive contact between said track conductor 370 and contact carrier 240. The track conductor may be in the form separate track conductors provided in the track portions or a single track conductor extending along both the track portions.

The guiding arrangement 390 may be arranged to guide the contact carrier 240 into contact with the track conductor 370 of the second track portion 320 after passage of the contact carrier 240 and/or hoist trolley to the second track portion upon movement of the hoist trolley along the second track portion 320 in the direction extending from the first track portion 310 to the second track portion 320. Thus, the guiding arrangement may allow for guiding the contact carrier 240 between track conductor portions. Thereby, a smooth transition for the contact carrier 240 to come into contact with the track conductor of the second track portion may be provided.

To provide the same guiding functionality in both directions, the guiding arrangement 390 may further be arranged to engage the contact carrier 240 to move it out of contact with the track conductor 370 of the second track portion 320 as the contact carrier 240 engages the guiding arrangement 390 upon movement of the hoist trolley in a direction extending from the second track portion 320 to the first track portion 310. Preferably, the guiding arrangement 390 is arranged to guide the contact carrier 240 into contact with the track conductor 370 of the first track portion 310 after passage of the contact carrier 240 and/or hoist trolley to the first track portion 310 upon movement of the hoist trolley along the first track portion 310 in the direction extending from the second track portion 320 to the first track portion 310.

Preferably, the guiding arrangement is only arranged to engage the engaging part 242 of the contact carrier to avoid wear and tear on the contact part of the contact carrier.

As depicted in FIG. 9, the guiding arrangement 390 comprises a guiding element 395. The guiding element 395 extends along the first track portion 310 and the second track portion 320. The guiding element 395 forms a first engaging portion 391. The first engaging portion 391 is arranged to intersect the track conductor 370 of the first track portion 310 to provide a transition for the contact carrier 240 from the first track portion 310 to a main portion 392, 394 of the guiding element 395.

The guiding element 395 may further form a second engaging portion 393. The second engaging portion 395 is arranged to intersect the track conductor 370 of the second track portion 320 to provide a transition for the contact carrier 240 from the second track portion 320 to the main portion 392, 394 of the guiding element 395.

To allow for flexible positioning of the first and second track portion, the guiding element 395 may be mounted to the first and second track portion. The first engaging portion 393 may be mounted to the first track portion 310 and the second engaging portion 395 may be mounted to the second track portion 320. Further, the main portion 392, 394 may comprise a first portion 392 mounted to the first track portion 310 and a second portion 394 mounted to the second track portion 320.

Preferably, the first and/or second engaging portion may be formed as wedges with a tapered end engaging the trajectory of the contact carrier 240, i.e. the engaging part 242. The angular face of the wedge is arranged to engage the contact carrier 240, i.e. the engaging part 242, to gradually move the contact carrier 240, i.e. the contact part 241, in or out of contact with the track conductor 370. The angular face of the wedge may thus be angular relative the track conductor of the track portion to enable movement of the contact carrier orthogonal to the extension of the track conductor.

Preferably, the engaging part of the contacting apparatus is arranged to protrude out of the first and second track portion for engaging the guiding element 395 mounted to the track.

Further referencing FIG. 9, the patient lift may comprise a first and second contacting apparatus. Each of the first track portion 310 and the second track portion 320 may be provided with a first and second track conductor 370. The contact carrier 240 of the first contacting apparatus may be arranged to be in conductive contact with the first track conductor and the contact carrier 240 of the second contacting apparatus may be arranged to be in conductive contact with the second track conductor. As depicted, the orientation of the first and second contacting apparatus may be mirrored relative the extension of the first and second track portion. This further increases the stability of the engagement between contacting apparatus and track.

In one embodiment, the first portion 310 and the second track portion 320 are formed as serially arranged sections of a single track.

In one embodiment, the first track portion 310 is formed by a first track 31 and the second track portion 320 is formed by a second track 32. The first track 31 and the second track 32 are aligned or alignable to form a junction accommodating passage of the hoist trolley between said first and second track. The guiding arrangement is arranged to engage the contact carrier 240 to move said contact carrier 240 out of contact with the track conductor 370 of the first track 31 as the contact carrier 240 approaches the junction upon movement of the hoist trolley in a direction extending from the first track 31 to the second track 32.

As depicted in said FIG. 9, the track system comprises the first track 31 and the second track 32. Each of the tracks comprises the track conductor 370. The track conductor 370 extends along the first and second track, respectively. The first track 31 and the second track 32 are aligned at the junction.

The patient lift comprises a guiding arrangement 390. The guiding arrangement 390 is arranged to engage the contact carrier 240. Preferably, the guiding arrangement 390 is arranged to engage the engaging part 242 of the contact carrier 240. The guiding arrangement 390 is arranged to engage the contact carrier 240 to move said contact carrier 240, preferably the contact part 241 of said contact carrier 240, out of contact with the track conductor 370 as the contact carrier 240 approaches the junction upon movement of the hoist trolley in a direction extending form the first track 31 to the second track 32. The guiding arrangement allows for a smoother transition for the contact carrier between the first and second track and through the junction. The guiding arrangement allows for guiding the contact carrier out of contact with the track conductor as the gap between the track conductor of the first and second track approaches. This reduces wear on the often fragile contact carrier due to said contact carrier bumping into the gap between the track conductors.

The guiding arrangement 390 may further be arranged to guide the contact carrier 240 into contact with the track conductor 370 of the second track 32 after the junction upon movement of the hoist trolley 103 along the second track 32 in the direction extending from the first track 31 to the second track 32. Thereby, a smooth transition for the contact carrier to come into contact with the track conductor of the second track may be provided.

To provide the same guiding functionality in both directions, the guiding arrangement 390 may further be arranged to engage the contact carrier 240 to move it out of contact with the track conductor 370 of the second track 32 as the contact carrier 240 approaches the junction upon movement of the hoist trolley in a direction extending from the second track 32 to the first track 31. Preferably, the guiding arrangement 390 is arranged to guide the contact carrier 240 into contact with the track conductor 370 of the first track 31 after the junction upon movement of the hoist trolley along the first track in the direction extending from the second track 32 to the first track 31.

FIG. 9 schematically depicts the movement of the contact carrier 240 relative the first track 31 and second track 32. The contact carrier 240 approaches the guiding arrangement 390, upon the contact carrier 240 engaging the guiding arrangement 390, the guiding arrangement 390 forces the biased contact carrier 240 away from the track conductor 370 of the first track 31 and into engagement with the guiding arrangement 390. After contact carrier 240 has passed by the junction, the guiding arrangement 390 guides the contact carrier 240 into contact with the track conductor 370 of the second track 32.

Preferably, the guiding arrangement 390 is arranged to provide a similar functionality if the hoist trolley moves from the second track 32 to the first track 31. Thus, upon movement of the hoist trolley from the second track 32 to the first track 31, the guiding arrangement 390 is arranged to first move the contact carrier 240 out contact with the track conductor 370 of the second track 32 and then into contact with the track conductor 370 of the first track 31 in a corresponding manner.

Alternatively, the contacting apparatus 200 may comprise a plurality of contact carriers, whereby the guiding arrangement 390 is arranged to cause the one of the contact carriers to come into contact with the first track 31 and come out of contact with the second track 32 as the hoist trolley moves from the first track to the second track and vice versa. Each contact carrier is thus only arranged to come into contact with the track conductor of one of the tracks.

As depicted in FIG. 9, the guiding arrangement 390 comprises a guiding element 395. The guiding element 395 extends along the first track 31 and the second track 32 and across the junction. The guiding element 395 forms a first engaging portion 391. The first engaging portion 391 is arranged to intersect the track conductor 370 of the first track 31 to provide a transition for the contact carrier 240 from the first track 31 to a main portion 392, 394 of the guiding element 395.

The guiding element 395 may further form a second engaging portion 393. The second engaging portion 395 is arranged to intersect the track conductor 370 of the second track 32 to provide a transition for the contact carrier 240 from the second track 31 to the main portion 392, 394 of the guiding element 395. The main portion 392, 394 may extend across the junction.

To allow for flexible positioning of the first and second track, the guiding element 395 may be mounted to the first and second track. The first engaging portion 393 may be mounted to the first track 31 and the second engaging portion 395 may be mounted to the second track 32. Further, the main portion 392, 394 may comprise a first portion 392 mounted to the first track 31 and a second portion 394 mounted to the second track 32.

Preferably, the engaging part of the contacting apparatus is arranged to protrude out of the first and second track for engaging the guiding element 395 mounted to the track.

Further referencing FIG. 9, the patient lift may comprise a first and second contacting apparatus. Each of the first track 31 and the second track 32 may be provided with a first and second track conductor 370. The contact carrier 240 of the first contacting apparatus may be arranged to be in conductive contact with the first track conductor and the contact carrier 240 of the second contacting apparatus may be arranged to be in conductive contact with the second track conductor. As depicted, the orientation of the first and second contacting apparatus may be mirrored relative the extension of the first and second track. This further increases the stability of the engagement between contacting apparatus and track.

The invention has been described above in detail with reference to embodiments thereof. However, as is readily understood by those skilled in the art, other embodiments are equally possible within the scope of the present invention, as defined by the appended claims.

The invention claimed is:

1. A patient lift, comprising:

a hoist comprising an electrically-actuated lifting member actuatable between a raised and lowered position;

a track system comprising a first track portion and a second track portion, wherein said first track portion comprises a track conductor, the track conductor extending along said first track portion;

a hoist trolley mounted to the hoist and movably connected to the track system, the first track portion and the second track portion being alignable or aligned to accommodate passage of the hoist trolley between said first and second track portion;

a contacting apparatus mounted to the hoist trolley, the contacting apparatus comprising a contact carrier arranged to be in conductive contact with the track conductor of the first track portion and a biasing arrangement, said biasing arrangement being adapted to resiliently bias the contact carrier against the track conductor to accommodate conductive contact between said track conductor and contact carrier; and a guiding arrangement being arranged to engage the contact carrier to move said contact carrier out of contact with the track conductor of the first track portion as the contact carrier engages the guiding arrangement upon movement of said hoist trolley in a direction extending from the first track portion to the second track portion.

2. The patient lift according to claim 1, wherein the second track portion comprises the track conductor extending along said second track portion, the contact carrier being arranged to be in conductive contact with said track conductor and the biasing arrangement being adapted to resiliently bias the contact carrier against said track conductor to accommodate conductive contact between said track conductor and contact carrier.

3. The patient lift according to claim 1, wherein the guiding arrangement is arranged to guide the contact carrier into contact with the track conductor of the second track portion after passage of the hoist trolley to the second track portion upon movement of the hoist trolley along the second track portion in the direction extending from the first track portion to the second track portion.

4. The patient lift according to claim 1, wherein the guiding arrangement comprises a guiding element extending along the first and second track portion, said guiding element forming a first engaging portion arranged to intersect the track conductor of the first track portion to provide a transition for the contact carrier from the first track portion to a main portion of the guiding element.

5. The patient lift according to claim 4, the guiding element forming a second engaging portion arranged to intersect the track conductor of the second track portion to provide a transition for the contact carrier from the second track portion to the main portion of the guiding element.

6. The patient lift according to claim 1, wherein the contacting apparatus comprising a mounting console adapted to be mounted to the hoist trolley and a lever arm pivotally connected to the mounting console, the biasing arrangement being adapted to resiliently bias the contact carrier against the track conductor to accommodate conductive contact between the track conductor and the contact carrier, said biasing arrangement resiliently connecting the lever arm and the mounting console.

7. The patient lift according to claim 1, comprising a first contacting apparatus and a second contacting apparatus, whereby any one or each of the first track portion and second track portion is provided with a first and second track conductor, wherein the contact carrier of the first contacting apparatus is arranged to be in conductive contact with the first track conductor and the contact carrier of the second contacting apparatus is arranged to be in conductive contact with the second track conductor.

8. The patient lift according to claim 1, wherein the first track portion is formed by a first track and the second track portion is formed by a second track, the first track and the second track being alignable or aligned to form a junction accommodating passage of the hoist trolley between said first and second track, the guiding arrangement being arranged to engage the contact carrier to move said contact carrier out of contact with the track conductor of the first track as the contact carrier approaches the junction upon movement of said hoist trolley in a direction extending from the first track to the second track.

9. The patient lift according to claim 8, wherein one of the first track and the second track is a stationary track and the other is a movable track.

10. The patient lift according to claim 9, wherein the movable track is translationally movable and/or rotationally movable relative the stationary track.

11. The patient lift according claim 1, wherein the first track portion and the second track portion are formed as serially arranged sections of a single track.

12. The patient lift according to claim 1, further comprising a battery unit electrically connected to the contacting apparatus for power transfer between the battery unit and the contacting apparatus.

13. The patient lift according to claim 1, further comprising a drive system adapted to drive the hoist trolley along the track system and a control unit operatively connected to said drive system and configured to control said drive system.

* * * * *